(12) United States Patent
Pan

(10) Patent No.: US 9,377,970 B1
(45) Date of Patent: Jun. 28, 2016

(54) SIMULTANEOUSLY PRINTING MULTIPLE DOCUMENTS TO MULTIPLE DESTINATIONS IN CLOUD PRINTING

(71) Applicant: Pingping Pan, Sunnyvale, CA (US)

(72) Inventor: Pingping Pan, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/639,379

(22) Filed: Mar. 5, 2015

(51) Int. Cl.
*G06F 3/12* (2006.01)

(52) U.S. Cl.
CPC ............ *G06F 3/1203* (2013.01); *G06F 3/1262* (2013.01); *G06F 3/1287* (2013.01)

(58) Field of Classification Search
CPC .... G06F 3/1203; G06F 3/1262; G06F 3/1287
USPC ....................... 358/1.15, 1.14, 1.13
See application file for complete search history.

(56) References Cited

U.S. PATENT DOCUMENTS

| | | | | |
|---|---|---|---|---|
| 7,127,451 B1 * | 10/2006 | Kimura | ................ | G06F 3/1204 358/1.14 |
| 8,427,663 B2 * | 4/2013 | Hayashi | ................ | G06F 3/1204 358/1.13 |
| 8,621,467 B2 * | 12/2013 | Takahashi | ............. | G06F 3/1222 718/102 |
| 2015/0227333 A1 * | 8/2015 | Tanaka | .................. | G06F 3/1267 358/1.15 |
| 2015/0229795 A1 * | 8/2015 | Wang | ................. | H04N 1/00209 358/1.13 |
| 2015/0242168 A1 * | 8/2015 | Yu | ......................... | G06F 3/1208 358/1.13 |
| 2015/0256404 A1 * | 9/2015 | Evans | ..................... | H04L 67/16 709/224 |
| 2015/0261273 A1 * | 9/2015 | Uchida | ..................... | G06F 3/12 713/310 |

* cited by examiner

*Primary Examiner* — Allen H Nguyen
(74) *Attorney, Agent, or Firm* — Hickman Palermo Becker Bingham LLP

(57) ABSTRACT

Systems and methods of processing print jobs comprising at least two documents and/or at least two printing devices via a cloud printing service are provided. A network printing server, in a cloud printing environment, can receive instructions to print the documents from any of a plurality of user devices to be printed at printing devices registered to the user device. The network printing server generates a print job for each file-destination pair. For each print job, the network printing server identifies one or more general options that apply to all of the print jobs and one or more detailed options that apply to a portion of the print jobs. The destination printing devices are connected via a public network (e.g., the Internet) to the network printing server that provides a cloud printing service.

18 Claims, 13 Drawing Sheets

| | | NORMAL USER |
|---|---|---|
| HTTPS://CLOUD_DOCS_EXAMPLE_PAGE.COM/MAIN | | |

CLOUDDOCS
- MONTHLY REPORTS
- WEEKLY REPORTS

| NAME | LAST MODIFIED | DOCUMENT SIZE |
|---|---|---|
| DEPARTMENT A MONTHLY REPORTS 2014 | | |
| DEPARTMENT B MONTHLY REPORTS 2014 | | |
| DEPARTMENT A MONTHLY REPORTS 2013 | | |
| DEPARTMENT B MONTHLY REPORTS 2013 | | |
| REPORT TEMPLATE.DOCX | MAY 26 | 56 KB |
| GENERAL INFORMATION.PDF | MAY 5 | 1.5 MB |

[NEW] [DELETE] [SHARE] [PRINT]

FIG. 7B

PRINT TOTAL: 25 DOCUMENTS TO BE PRINTED

PRINT DESTINATIONS: PRINTER A; PRINTER B; PRINTER C

CHANGE

———— GENERAL PRINT OPTIONS ————

COPIES: 1

PAGES: ⦿ ALL ◯ E.G. 1-5, 9

DUPLEX: OFF

ORIENTATION: PORTRAIT

PRINT  CANCEL

SET DETAILED OPTIONS

FIG. 8A

| DETAILED PRINT OPTIONS | PRINTER A | PRINTER B | PRINTER C |
|---|---|---|---|
| 25 DOCUMENTS TO BE PRINTED TO 3 PRINT DESTINATIONS | | | |
| ALL DOCUMENTS | COPIES: 1  PAGES: ALL<br>DUPLEX: OFF<br>ORIENTATION: PORTRAIT<br>COLOR: COLOR<br>CHANGE | COPIES: 1  PAGES: ALL<br>DUPLEX: OFF<br>ORIENTATION: PORTRAIT<br>COLOR: COLOR<br>STAPLE: OFF  CHANGE | COPIES: 1  PAGES: ALL<br>DUPLEX: OFF<br>ORIENTATION: PORTRAIT<br>COLOR: BLACK & WHITE<br>CHANGE |
| DEPARTMENT A MONTHLY REPORTS 2014-12 | COPIES: 1  PAGES: ALL<br>DUPLEX: OFF<br>ORIENTATION: PORTRAIT<br>COLOR: COLOR<br>CHANGE | COPIES: 1  PAGES: ALL<br>DUPLEX: OFF<br>ORIENTATION: PORTRAIT<br>COLOR: COLOR<br>STAPLE: OFF  CHANGE | COPIES: 1  PAGES: ALL<br>DUPLEX: OFF<br>ORIENTATION: PORTRAIT<br>COLOR: BLACK & WHITE<br>CHANGE |
| ... | ... | ... | ... |
| DEPARTMENT A MONTHLY REPORTS 2013-01 | COPIES: 1  PAGES: ALL<br>DUPLEX: OFF<br>ORIENTATION: PORTRAIT<br>COLOR: COLOR<br>CHANGE | COPIES: 1  PAGES: ALL<br>DUPLEX: OFF<br>ORIENTATION: PORTRAIT<br>COLOR: COLOR<br>STAPLE: OFF  CHANGE | COPIES: 1  PAGES: ALL<br>DUPLEX: OFF<br>ORIENTATION: PORTRAIT<br>COLOR: BLACK & WHITE<br>CHANGE |
| GENERAL INFORMATION | COPIES: 1  PAGES: ALL<br>DUPLEX: OFF<br>ORIENTATION: PORTRAIT<br>COLOR: COLOR<br>CHANGE | COPIES: 1  PAGES: ALL<br>DUPLEX: OFF<br>ORIENTATION: PORTRAIT<br>COLOR: COLOR<br>STAPLE: OFF  CHANGE | COPIES: 1  PAGES: ALL<br>DUPLEX: OFF<br>ORIENTATION: PORTRAIT<br>COLOR: BLACK & WHITE<br>CHANGE |

OK  CANCEL

FIG. 8B

| NAME | SUBMITTED | STATUS |
|---|---|---|
| ☐ DEPARTMENT A MONTHLY REPORTS 2014-12 | NOV 5 | QUEUED |
| ☐ DEPARTMENT A MONTHLY REPORTS 2014-12 | NOV 5 | PRINTED |
| ☐ DEPARTMENT A MONTHLY REPORTS 2014-12 | NOV 5 | IN PROGRESS |
| ..... | | |
| ☐ DEPARTMENT A MONTHLY REPORTS 2013-01 | NOV 5 | IN PROGRESS |
| ☐ DEPARTMENT A MONTHLY REPORTS 2013-01 | NOV 5 | PRINTED |
| ☐ DEPARTMENT A MONTHLY REPORTS 2013-01 | NOV 5 | PRINTED |
| ☐ GENERAL INFORMATION | NOV 5 | PRINTED |
| ☐ GENERAL INFORMATION | NOV 5 | ERROR |
| ☐ GENERAL INFORMATION | NOV 5 | PRINTED |

NORMAL USER

HTTPS://CLOUD_PRINT_EXAMPLE_PAGE.COM/PRINT_JOBS

PRINT JOBS
PRINTERS

[DELETE] [DETAILS]

SIMULTANEOUSLY PRINTING MULTIPLE DOCUMENTS TO MULTIPLE DESTINATIONS IN CLOUD PRINTING

FIELD OF THE INVENTION

Embodiments relate generally to cloud printing of electronic documents.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Cloud printing services, such as Google Cloud Print, allow users to initiate print jobs over the Internet from various web-connected devices to a web-enabled printing device. Cloud printing services do not require that the printing device nor the user device be connected to an enterprise network, such as an intranet or an extranet. Within a cloud printing service, a printing device can be shared across multiple users or user devices.

SUMMARY

According to an embodiment, a network printing server comprises: one or more processors; and one or more non-transitory data storage media in the network printing server storing instructions which when processed cause the network printing server to perform: for a user device logically connected to the network printing server, determining a set of one or more printing devices from a plurality of printing devices available to the network printing server; receiving, via a public network, an instruction to print a plurality of documents at a particular printing device of the set of one or more printing devices from the plurality of the printing devices; generating, for each document of the plurality of documents, an instruction instructing the particular printing device to print the document; and transmitting, via the public network, the generated instructions for printing each document of the plurality of documents as a series of print jobs to the particular printing device.

BRIEF DESCRIPTION OF THE DRAWINGS

In the figures of the accompanying drawings like reference numerals refer to similar elements.

FIGS. 7A-9 depict example user interfaces used for defining a plurality of print jobs, setting general and detailed print options, and monitoring sent print jobs, according to various embodiments.

DETAILED DESCRIPTION

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.

I. OVERVIEW
II. SYSTEM ARCHITECTURE
  A. User device
  B. Network Printing Server
  C. Printing Devices
III. ACQUIRING AND SUBMITTING PRINT JOBS
IV. SETTING PRINT OPTIONS
  A. Setting General Options
  B. Setting Detailed Options
VI. MANAGING BATCH PRINT JOBS
VII. EXAMPLE USER INTERFACES
  A. Selecting Documents
  B. Setting Print Options
  C. Tracking Status of Print Jobs
VIII. IMPLEMENTATION MECHANISMS

I. OVERVIEW

Network printing servers and methods for managing submission of batch print jobs, i.e., multiple documents to multiple printing devices for printing, are provided. The network printing server, in a cloud printing environment, can receive instructions to print documents from any of a plurality of user devices to be printed at printing devices. Each of the user devices are able to print to a subset of the printing devices connected via the cloud printing environment. The instructions identify one or more documents and one or more printing devices of the subset of printing devices. The network printing server generates print jobs for each document and destination identified in the instructions. For each print job, the network printing server identifies one or more general options that apply to each specified print job and one or more detailed options that apply to a portion of the print jobs. Default options can be selected based on properties of the document to be printed and/or based on properties of the printing device. The network printing server further provides a graphical user interface that allows a user to modify any of the options. The destination printing devices are connected via one or more networks (e.g., the Internet) to the network printing server that provides a cloud printing service. Upon receiving a print job, the printing device executes the print job. The printing devices return status data for print jobs which is then aggregated by the network printing service and reported to the user device.

II. SYSTEM ARCHITECTURE

Figure 1:
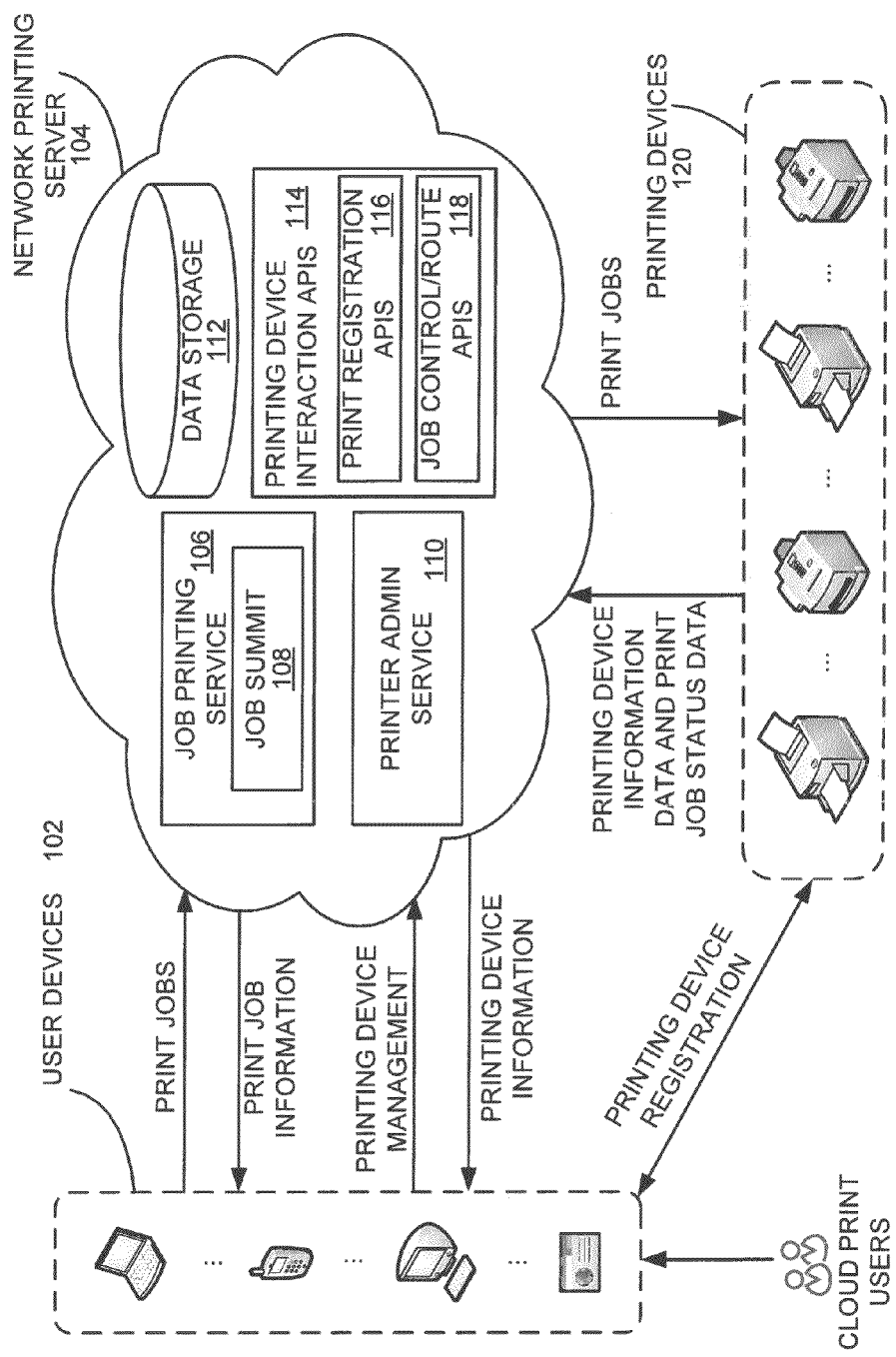
FIG. 1 depicts a block diagram of an example environment for managing and submitting print jobs to a plurality of printing devices.

FIG. 1 depicts a block diagram of an example environment 100 for managing and submitting print jobs to a plurality of printing devices. The environment 100 includes a plurality of user devices 102 operated by cloud print users. The user devices 102 communicate with a network printing server 104 for submitting print jobs to a plurality of printing devices 120. The environment 100 is not limited to the particular elements depicted in FIG. 1 and may include fewer or additional elements depending upon a particular implementation. Embodiments are described herein in the context of a single user device 102 for purposes of explanation, but the approach is applicable to any number of user devices. The network printing server 104 is depicted in FIG. 1 as a single element for purposes of explanation only.

A. User Device

User device 102 may be any type of user device and examples of user device 102 include, without limitation, a smart phone, a camera, a tablet computing device, a personal digital assistant, a laptop computer, or a desktop computer. The user device 102 includes a display, data acquisition component, applications, a communications interface, a power/power management component, an operating system and a computing architecture that includes a processor and memory, for accessing, viewing, visiting (e.g., visiting web content via a web browser), or storing documents to be printed. For example, the Google Chrome operating system is designed for web use; so instead of creating, editing, or deleting files stored locally on the user device, Chromebook users can create, edit, and delete cloud files using the Chrome browser. User device 102 may include various other components that may vary depending upon a particular implementation and user device 102 is not limited to a particular set of components or features. For example, user device 102 may include a location component, such as one or more GPS components that is capable of determining a current location of user device 102 and generating location data that indicates the current location of user device 102. The user device 102 may include a camera, capable of capturing and storing digital images. User device 102 may also include manual controls, such as buttons, slides, etc., not depicted in FIG. 1, for performing various functions on user device, such as powering on/off or changing the state of user device 102 and/or display.

The display may be implemented by any type of display that displays images and information to a user and may also be able to receive user input and embodiments are not limited to any particular implementation of display. User device 102 may have any number of displays, of similar or varying types, located anywhere on user device 102.

The data acquisition component may comprise hardware subcomponents, programmable subcomponents, or both. For example, the data acquisition component may include one or more cameras, scanners, memory units or other data storage units, buffers and code instructions for acquiring, storing and transmitting data, or any combination thereof. The data acquisition component may be configured with a Wi-Fi interface and a barcode reader. The Wi-Fi interface may be used to transmit information to and from the data acquisition component. The barcode reader may be used to scan or otherwise acquire a code, such as a point of sale (POS) code displayed on an item.

The communications interface may include computer hardware, software, or any combination of computer hardware and software to provide wired and/or wireless communications links between the user device 102 and other devices and/or networks. The particular components for communications interface may vary depending upon a particular implementation and embodiments are not limited to any particular implementation of communications interface. The power/power management component may include any number of components that provide and manage power for user device 102. For example, the power/power management component may include one or more batteries and supporting computer hardware and/or software to provide and manage power for user device 102.

The computing architecture may include various elements that may vary depending upon a particular implementation and user device 102 is not limited to any particular computing architecture. The computing architecture includes a processor and a memory. The processor may be any number and types of processors and memory may be any number and types of memories, including volatile memory and non-volatile memory, which may vary depending upon a particular implementation. Computing architecture may include additional hardware, firmware and software elements that may vary depending upon a particular implementation. In the example depicted in FIG. 1 memory stores documents that can be printed by one or more printing devices as described in more detail hereinafter, but memory may store additional data depending upon a particular implementation.

The operating system executes on the computing architecture and may be any type of operating system that may vary depending upon a particular implementation and embodiments are not limited to any particular implementation of operating system. The operating system may include multiple operating systems of varying types, depending upon a particular implementation. Applications may be any number and types of applications that execute on computing architecture and operating system. Applications may access components in user device 102, such as a display, camera, computing architecture, communications interface, power/power management component and other components not depicted in FIG. 1, via one or more application program interfaces (APIs) for the operating system.

Applications may provide various functionalities that may vary depending upon a particular application and embodiments are not limited to applications providing any particular functionality. Common non-limiting examples of applications include printing applications or plugins, social media applications, navigation applications, telephony, email and messaging applications, and Web service applications.

In the example of FIG. 1, applications can include one or more cloud printing applications that allow the user devices 102 to register with one or more printing devices 120. Once a user device 102 is registered with a printing device 120, the printing device 120 is available to the user device 102. In some embodiments, a user of the network printing server 104 is allowed to register one or more printing devices 120 to network printing server 104 via user devices 102 or control units in printing devices 120. Once a printing device 120 is registered to the network printing server 104, the registered printing device 120 is available to the user. The user can access registered printing devices 120 from network printing server 104 via a user device 102. The user device 102 can then send print jobs to the printing device 120 via the network printing server 104. If the user device 102 is not registered with a particular printing device 120, the user device 102 is not able to print to the particular printing device 120. In some embodiments, if a particular printing device 120 is not registered by a designated user, the designated user is not able to print to the particular printing device 120 via user devices 102. A user can share his/her registered printing devices 120 with other user of the network printing server 104. Once a user of the network printing server 104 registers with a shared printing device 120, he can print documents to shared printing device 120. In some instances, registration procedure comprises a handshake protocol initiated by the user device 102.

The handshake may be a two-way handshake between the user device 102 and the printing device 120. In other embodiments, the handshake may be a three-way handshake, further involving the network printing server 104. In some instances, the respective printing devices 120 can be separately registered with the user devices 102 and the network printing server 104. Likewise, the user devices 102 can be separately registered with the printing devices 120 and the network printing server 104.

The user devices 102 or the user via another user device 102, once registered with a set of printing devices 120, transmits print jobs to the network printing server 104. The network printing server 104 can receive a selection of multiple documents to be printed and a selection of multiple printing devices within the set of printing devices that have been registered by the user device 102. In response, the user device 102 can receive print job information describing status of one or more print jobs. The user device 102 received printing device information from the network printing server 104. The printing device information describes the capabilities and attributes of the registered printing devices 120. In response, the user device 102 sends printing device management information to the network printing server 104. The printing device management information describes one or more user-selected options associated with one or more of the print jobs.

B. Network Printing Server

In the example depicted in FIG. 1, network printing server 104 includes a job printing service 106 comprising a job summit 108, a printer administration service 110, data storage 112, and printing device interaction APIs 114. Network printing server 104 may be implemented in a wide variety of ways that may vary depending upon a particular implementation, and network printing server 104 is not limited to any particular implementation. For example, network printing server 104 may be implemented by computer hardware, computer software, or any combination of computer hardware including, but not limited to, servers, network services, etc. The printing device APIs comprise print registration APIs 116 and job control/routing APIs 118. Network printing server 104 may include various other components that may vary depending upon a particular implementation and network printing server 104 is not limited to a particular set of components or features. Network printing server 104 may include various hardware and software components that may vary depending upon a particular implementation and network printing server 104 is not limited to any particular hardware and software components.

The job printing service 106 is configured to process the batch print jobs received from the user devices 102. The job printing service 106, upon receiving a selection of documents and a selection of printing devices 120, generates two or more print jobs. Each print job is one file that is printed by one printing device. As referenced herein, the individual print jobs can be represented as an ordered pair such as <file, destination> or n-tuple that can include general options and/or detailed options. The ordered pair includes a file identifier (referred to in ordered pair as "file") and a printing device identifier (referred to in the ordered pair as "destination"). Other data structures can be used to represent the individual print jobs.

The generated print jobs are stored and managed by the job summit 108. The job summit 108 may comprise a computing data structure for holding or queuing the generated print jobs. For example, the <file,destination> ordered pair (or an n-tuple representing the print job) may be stored in a list (e.g., a linked list), queue, or associative array. In some embodiments, the <file,destination> ordered pair can be stored and retrieved using hash functions. The print jobs may include the actual file to be printed or may include a link to a stored copy of the file. In some instances, files corresponding to the print jobs are stored in the data storage 112. In other instances, the link may point to a file stored at the user device 102 or another location.

Figure 2:
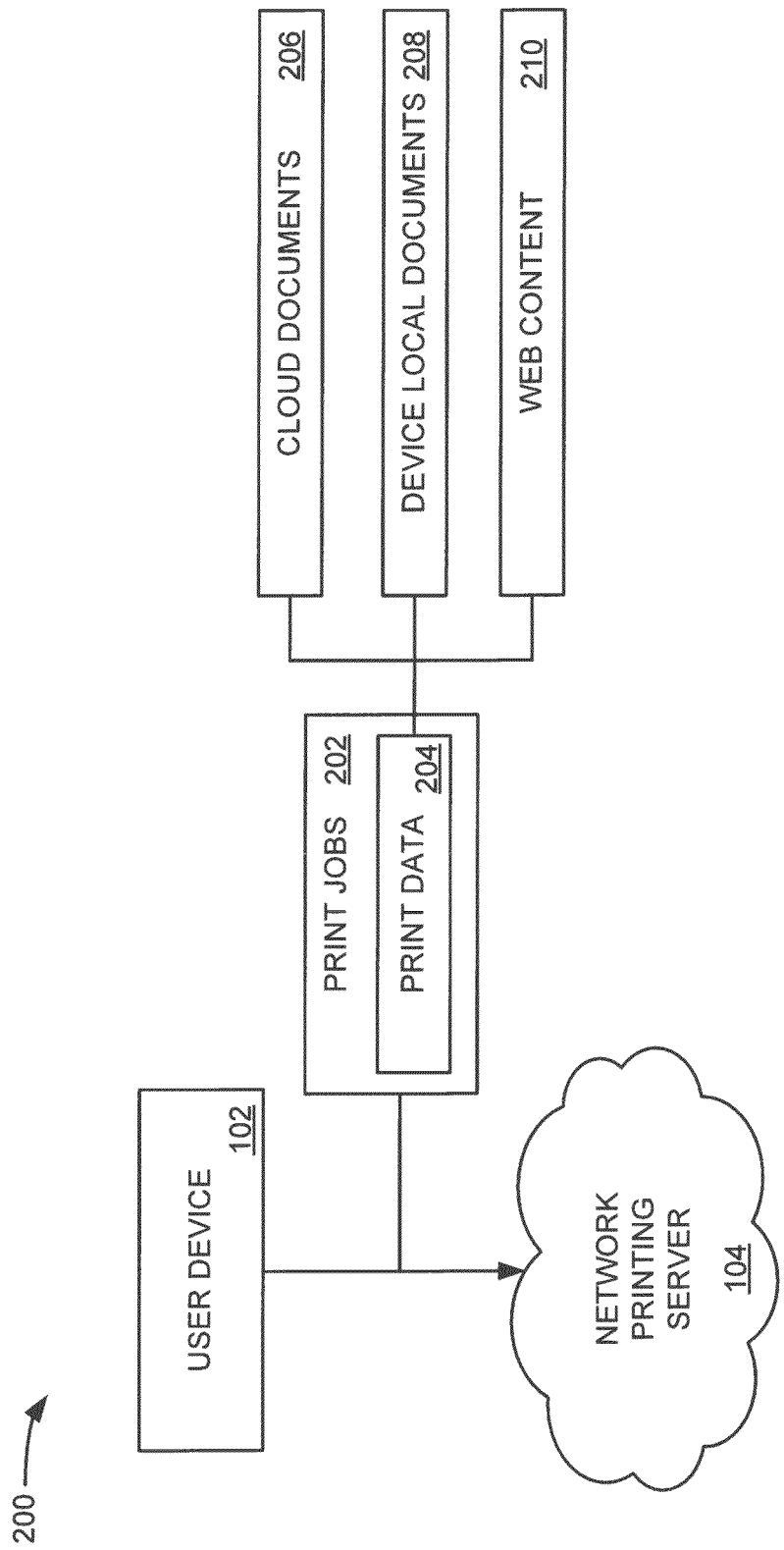
FIG. 2 depicts a schematic diagram of print data types that can be printed according to various embodiments.

FIG. 2 depicts a schematic diagram 200 of examples of print data types that can be printed according to various embodiments. The user devices 102 generate instructions to print one or more documents at each of one or more destinations registered to the respective user or user device 102. The instructions, which may be in the form of print jobs 202, can include print data 204. The print data 204 includes the file to be printed or a link to the document to be printed. The documents to be printed can include, but are not limited to, documents stored in a cloud (i.e., cloud documents 206), documents stored locally on the user device 102 (i.e., device local documents 208), and web content 210.

Referring back to FIG. 1, the printer administration ("admin") service 110 accesses the print jobs stored in the job summit 108 and sends the print jobs to the respective printing devices 120. The printer administration service 110 further processes printing device information data and print job status data received from the printing devices 120. In some instances, the printer administration service 110 can resend or modify print jobs after initial transmission of the print job to the printing device 120. The printer administration service can aggregate print job status data and transmit the same to the user device 102.

The printing device interaction APIs 114 are used to send commands to print a file to a particular printing device 120. The print registration API 116 allows the printing devices 120 to register with, and be recognized by, the network printing server 104 and its constituent elements. The job control/route APIs 118 are APIs used to send particular jobs to particular printing devices 120. The APIs can further be used to detect the capabilities and current status of the individual printing devices 120.

C. Printing Devices

The printing devices 120 comprise physical devices that can print documents onto paper or other physical materials. Like the user devices 102, the printing devices 120 comprise processors, memory, networking, and I/O computing components to receive and process instructions. Specifically, the printing devices 120 are configured to communicate with the network printing server 104 via a public network, such as the Internet. In some instances, the printing devices 120 are configured to communicate with the user devices 102 via the public network. Examples of the printing devices 120 include, but are not limited to: printers; photo printers; multi-purpose units comprising a printer, scanner, copier, and/or fax machine; and special purpose printing devices such as receipt printers, postage printers, large format printers, 3-D printers, and printers for printing on non-paper materials.

III. ACQUIRING AND SUBMITTING PRINT JOBS

The network printing server 104 acquires print jobs from the user devices 102. The network printing server 104 can receive a selection of one or more documents to be printed and/or of one or more destination printing devices 120. The network printing server 104 may determine two or more <file,destination> pairs from the selection. Based on printing device information of the selected printing devices, the network printing server 104 allows a user to specify print options for the print jobs and confirm the print request. The network printing server 104 communicates the print jobs, along with selected options, to the destination printing devices 120.

Figure 3:
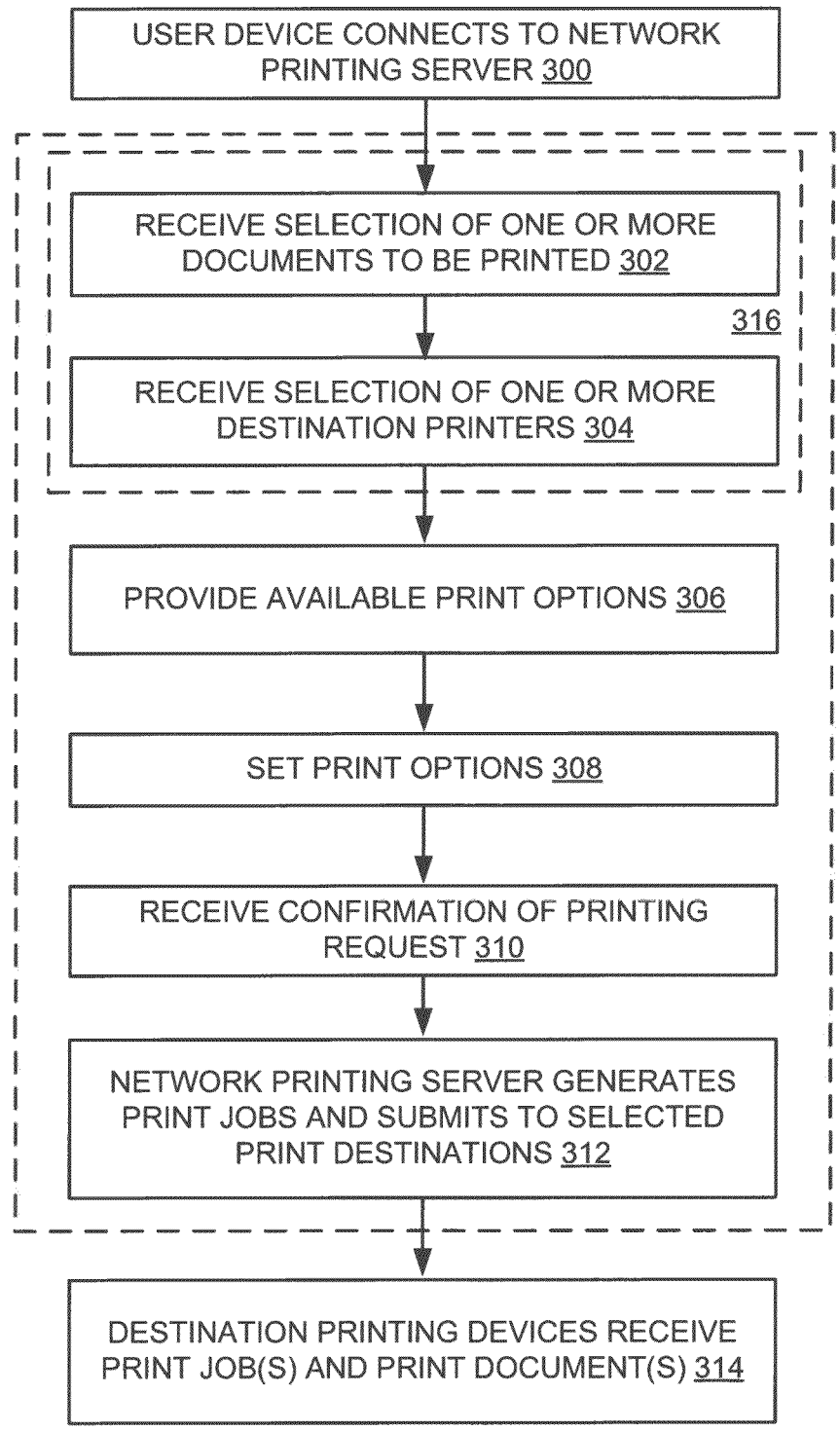
FIG. 3 depicts a flowchart of an example method of managing print jobs, according to various embodiments.

FIG. 3 depicts a flowchart of an example method of managing print jobs, according to various embodiments. The method of FIG. 3 is provided as a high level explanation of tasks performed within the environment 100 to simultaneously execute two or more print jobs. Further details are provided in the figures following FIG. 3.

In an operation 300, a user device 102 connects to the network printing server 104. The user device 102 may connect by establishing an electronic communication link via a public network, such as the Internet. The connection can be secure and encrypted. In some instances, the connection is a Secure Sockets Layer (SSL) connection. The operation 300 can be performed by a printing application running on the user device 102. In some instances, the operation 300 is performed when a user of the user device 102 initiates a print command by selecting a printing dialog box or by selecting a printing icon in another application.

In an operation 302, a selection of one or more documents to be printed is received at the network printing server 104 from one of the user devices 102. The selection may include storage locations of the documents to be printed or other information useable to access the one or more selected documents. The selection may include documents having a same format or documents having different formats. In instances where the selected documents comprise device local documents 208, each of the selected documents may be located in a common file folder at the user device 102 or may be stored in separate file folder. In instances where the selected documents comprise cloud documents 206 or web content 210, the selection may be identified via a URL or other non-local identifier. The selection may be facilitated at the user device 102 via a printing application that allows the user to add documents to a designated "printing" folder or other location that persists separately from the applications used to access the documents to be printed. In some embodiments, the user may, via a GUI, add documents over time to a "shopping cart"-like interface that stores the documents (or identifiers of the documents) until the user decides to print all or a portion of the documents.

In an operation 304, a selection of one or more printing devices 120 is received at the network printing server 104 from the user device 102. The selected printing devices are referred to as "destinations", "destination printers", or "destination printing devices". To facilitate the selection, the user device 102 may provide a GUI that allows the user to select one or more printing devices from the set of printing devices previously registered with the user or the user device 102. The GUI may further include an option to register with additional printing devices 120 and to print to newly-registered printing devices 120. The selection may include information about the printing device or information usable to initiate a verification or validation process that is completed before the printing devices begins printing the selected documents.

In some embodiments, as indicated by dotted-line box 316, the operations 302 and 304 can be performed in reverse order, in which the selection of the destinations is received prior to the selection of the one or more documents. In other embodiments, the operations 302 and 304 can be performed simultaneously, where the user device 102 sends both types of selections as part of a single communication.

In an operation 306, a GUI showing available print options is provided to the user device 102 by the network printing server 104. The GUI may include one or more default settings and/or one or more prompts to set specific settings within print jobs. The GUI and the print options are discussed in greater detail below.

In an operation 308, the print options are set based on user input received in the operation 306. The print options can be set based on attributes of the documents to be printed and/or attributes of the destination printing devices. In some instances, the print options are set based on defaults that were unchanged by the user.

In an operation 310, confirmation of the printing request is received from the user. The confirmation may be received in response to a prompt provided to the user. In instances where the user fails to confirm the printing request, the user can be provided the GUI showing available print options or can be provided an option to cancel all or a portion of the print request. For example, the user can deselect documents to be printed or can deselect one or more destination printing devices. Other options can also be presented to the user if the user fails to confirm the printing request.

In an operation 312, the print jobs are generated by the network printing server 104. The generated print jobs can each be represented by a <file,destination> pair. In some instances, the generated print job can include indications of one or more print options. For example, the <file,destination> pair can be extended to form an n-tuple where each added element indicates a print option. In some embodiments, each position in the n-tuple corresponds to a pre-defined attribute and a value assigned to the attribute is included in the n-tuple. The individual print jobs are then sent from the network printing server 104 to the respective destination printing devices 120.

In an operation 314, the various destination printing devices 120 receive the print jobs and the corresponding print options. Using this information, the destination printing devices 120 print the documents. In some embodiments, the destination printing devices 120 return status data of the print jobs, including an indication that the print job is completed when the file is printed, or an indication of an error if a print job cannot be successfully completed.

IV. SETTING PRINT OPTIONS

Figure 4:
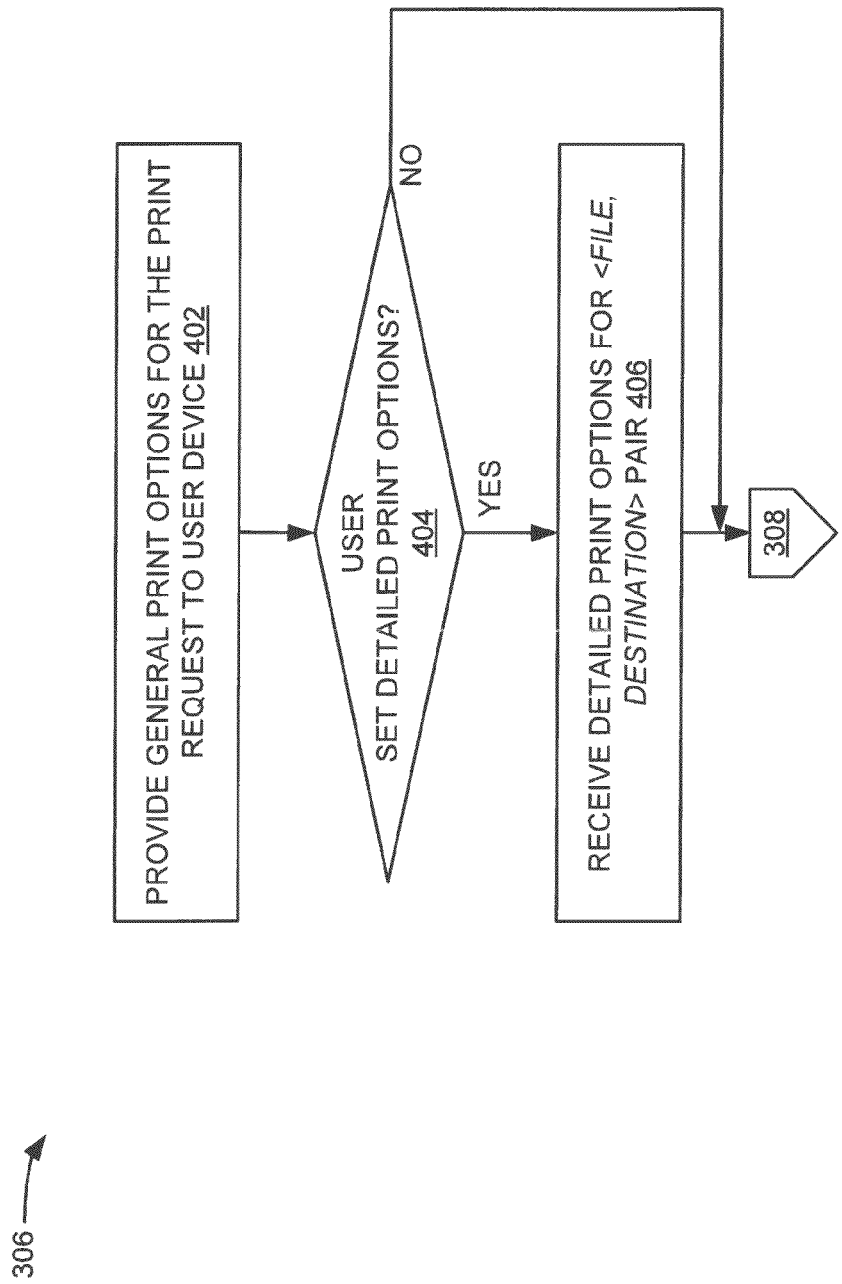
FIG. 4 depicts a flowchart of an example method of setting one or more print options, according to various embodiments.

FIG. 4 depicts a flowchart of an example method of setting one or more print options in the operation 306, according to various embodiments. The operation 306 can be performed by the network printing server 104 in response to receiving a print request that identifies one or more documents and one or more destination printing devices. The printing device settings can be set in two stages: first, general settings that apply to each of the <file,destination> pairs; and, second, detailed settings that correspond to a portion of the <file,destination> pairs.

In an operation 402, general print options for the print request are provided to the user via, e.g., a GUI. The general print options are default settings that apply to each of the <file,destination> pairs. In some embodiments, the general print options are determined by the network printing server 104 based on printing device information received about the printing devices 120. In some instances, the general print options are selected based on one or more file attributes of the selected documents to be printed. In some embodiments, the general options are attribute-value pairs where the value is a pre-defined default value. The operation 402 is further discussed in connection with FIG. 5A.

In an operation 404, a determination is made as to whether the user is able to or is required to set detailed print options for at least one of the <file,destination> pairs. The user can be required to set a detailed printing option to resolve a conflict between attributes of the file and a default printing option at a destination. The user can set detailed options via a GUI provided to the user device 102. If no detailed print options are to be set, the operation 306 ends and the process continues with the operation 308 of FIG. 3.

If the user will set detailed print options, the operation 306 continues to an operation 406, the detailed print options are received from the user device 102 for at least one of the <file,destination> pairs. In embodiments where the print options are expressed as attribute-value pairs, the detailed instructions comprise a non-default value associated with an attribute. Once the detailed options are received, the process continues with the operation 308 of FIG. 3.

A. Setting General Options

Figure 5A:
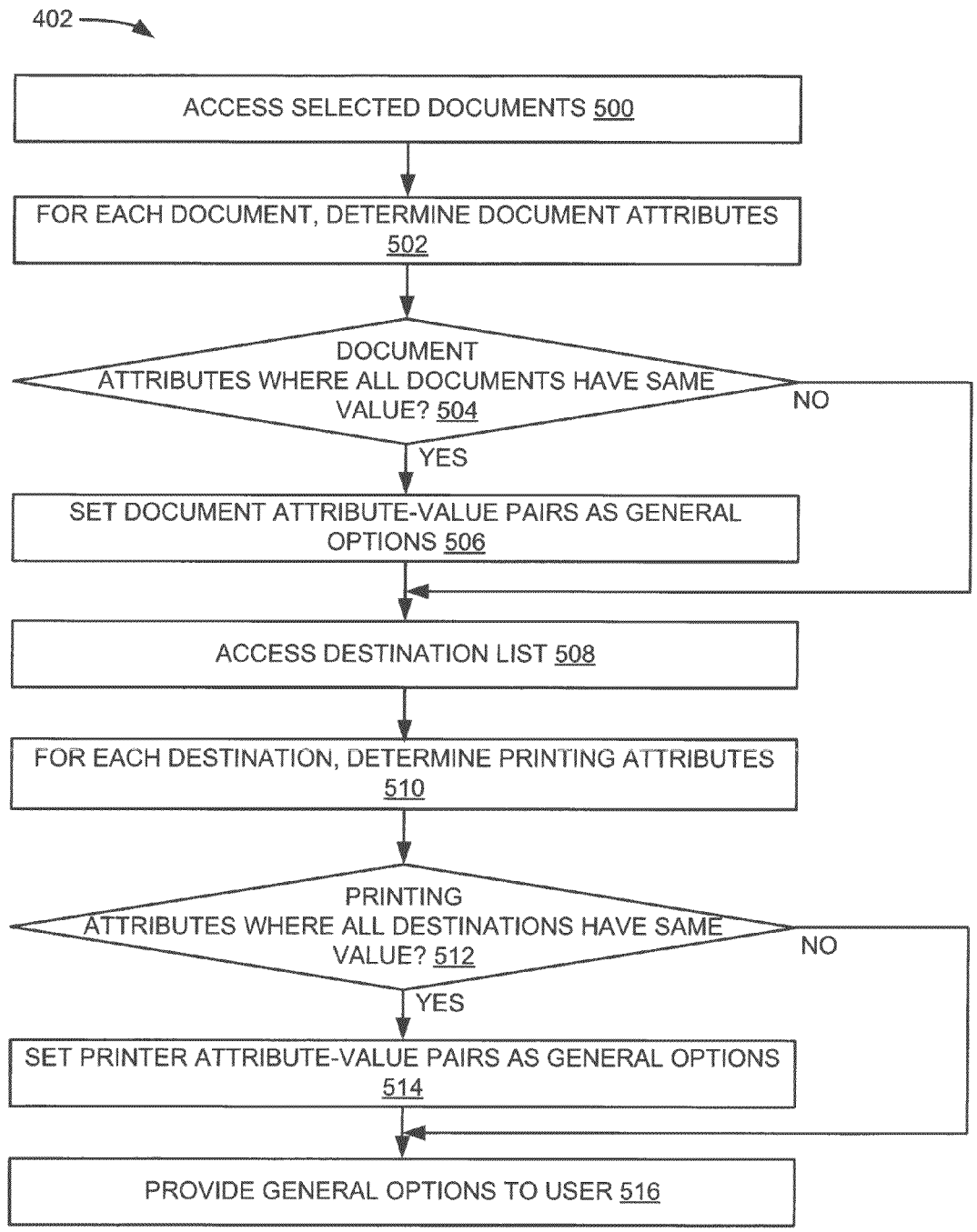
FIG. 5A depicts a flowchart of an example method of setting one or more general options, according to various embodiments.

General print options can be fixed by the network printing server 104 or generated dynamically. In some instances, general print options can be set by the user. Non-limiting examples of general print options that can be set by the user include a number of copies to be printed at each printing device, pages to be printed from a file, duplex setting, and paper orientation. FIG. 5A depicts a flowchart of an example method of dynamically generating one or more general print options, according to various embodiments. General options are print options that are the same across all or a portion of the print jobs included in the print request. In some instances, the general print options comprise default options. The general options can be based on file attribute-value pairs and/or destination attribute-value pairs. The method of FIG. 5A can be performed as part of the operation 402 of FIG. 4.

In an operation 500, the selected documents are accessed by the network printing server 104. In some instances, the documents are uploaded into the network printing server 104. In other instances, the documents stored on the user devices 102 or in a cloud storage system are accessed via a public network connection. In some embodiments, metadata describing the selected documents is accessed.

In an operation 502, file attributes of each of the selected documents are determined by the network printing server 104 and/or the user device 102. The file attributes are attributes specified within the file itself, independently of the printing devices 120. The file attributes can include, for example, whether the file contains color, paper size, and margins. The file attributes can be assigned a value.

In an operation 504, a determination is made as to whether there are any file attributes for which all of the documents have a same value. If there are no such attributes, the process 402 skips to an operation 508. In instances where there is at least one file attribute having a same value, the at least one attribute-value pair(s) containing the same value(s) is set as a general option(s), in an operations 506.

In an operation 508, a list of the destinations is accessed by the network printing server 104. In an operation 510, the printing attributes of each of the destinations are determined. The printing attributes of the destinations include available values and default values of the attributes. For example, the printing attributes of the destination can include page size, resolution, and color printing.

In an operation 512, a determination is made as to whether there are any destination attributes for which all of the destinations have a same value. If there are no such attributes, the process 402 skips to an operation 516. In instances where there is at least one destination attribute having a same value, the at least one attribute-value pair(s) containing the same value(s) is set as a general option(s), in an operations 514.

In an optional operation 516, the general options are provided by the network printing server 104 to the user device 102 for presentation to the user.

B. Setting Detailed Options

Figure 5B:
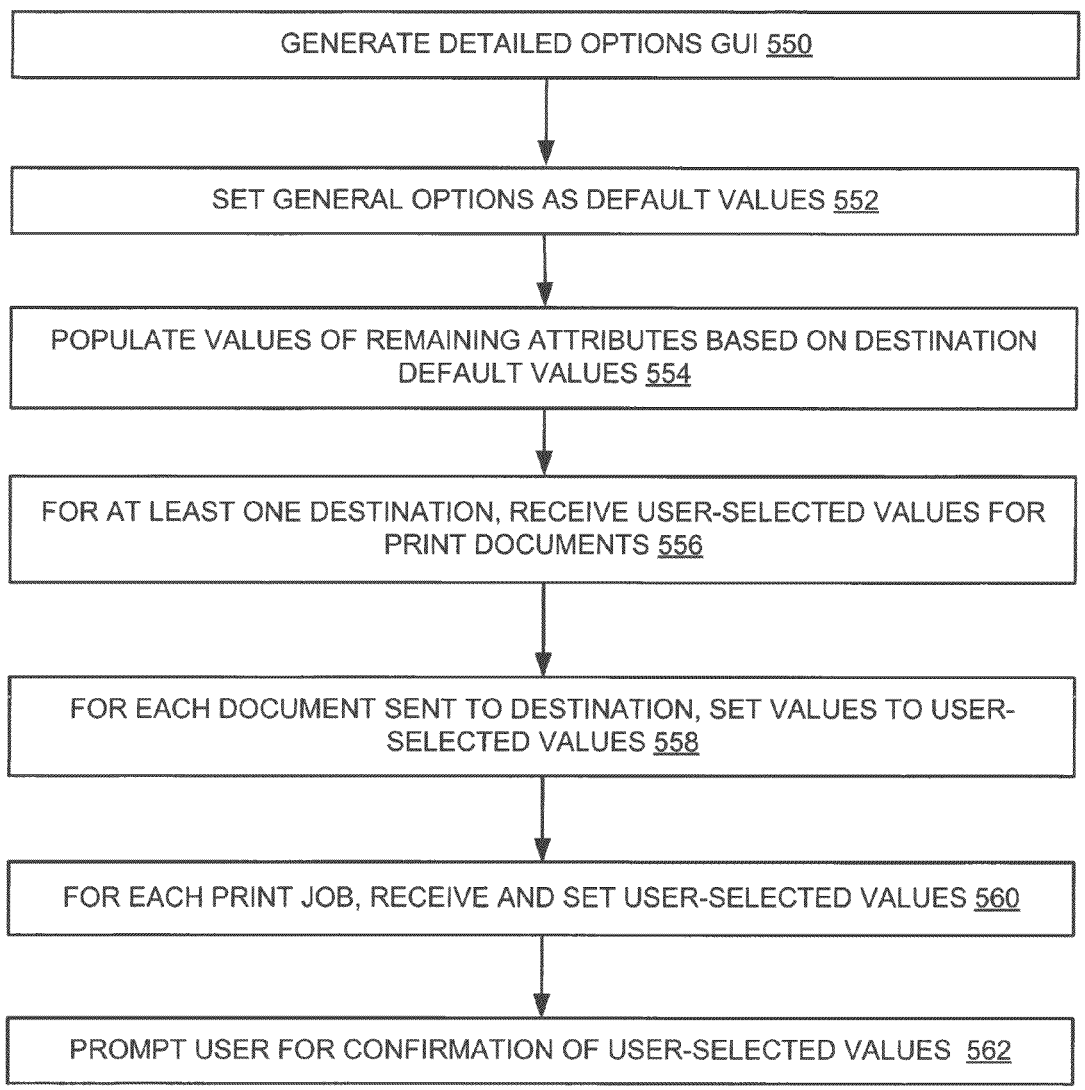
FIG. 5B is a flowchart of an example method of setting one or more detailed options, according to various embodiments.

FIG. 5B is a flowchart of an example method 406 of setting one or more detailed options, according to various embodiments. The detailed options can be set on a per-destination basis or for each <file,destination> pair. The detailed options can be used to customize each print job to each destination printing device or to resolve conflicts between file attributes and printing device attributes or capabilities.

In an operation 550, a detailed options GUI is generated by the network printing server 104 and provided to the user device 102. The detailed options GUI provides a mechanism for the user to change one or more detailed options.

In an operation 552, the general operations (e.g., the general options of operations 506 and 514) are set as default values by the network printing server 104. The general options may be indicated in the detailed options GUI.

In an operation 554, if there are any attributes not assigned a value in the general options, the values of the remaining attributes are populated based on destination default values by the network printing server 104. The destination default values are set by the printing devices 120. It is noted that the some destinations may have attributes that other destinations do not have, so that general options are not set for those attributes.

In an operation 556, for at least one of the destinations, a user-selected value(s) for the print documents printed to that destinations is received. In response, in an operation 558, for each file sent to the destination, corresponding attribute values are set to the user selected value(s) received in the operation 556.

In an operation 560, for each print job corresponding to a <file,destination> pair, user-selected values of attributes can be received and set via a GUI provided by the network printing server 104. In an operation 562, a prompt is presented to the user requesting confirmation of the user-selected values.

VI. MANAGING BATCH PRINT JOBS

Figure 6:
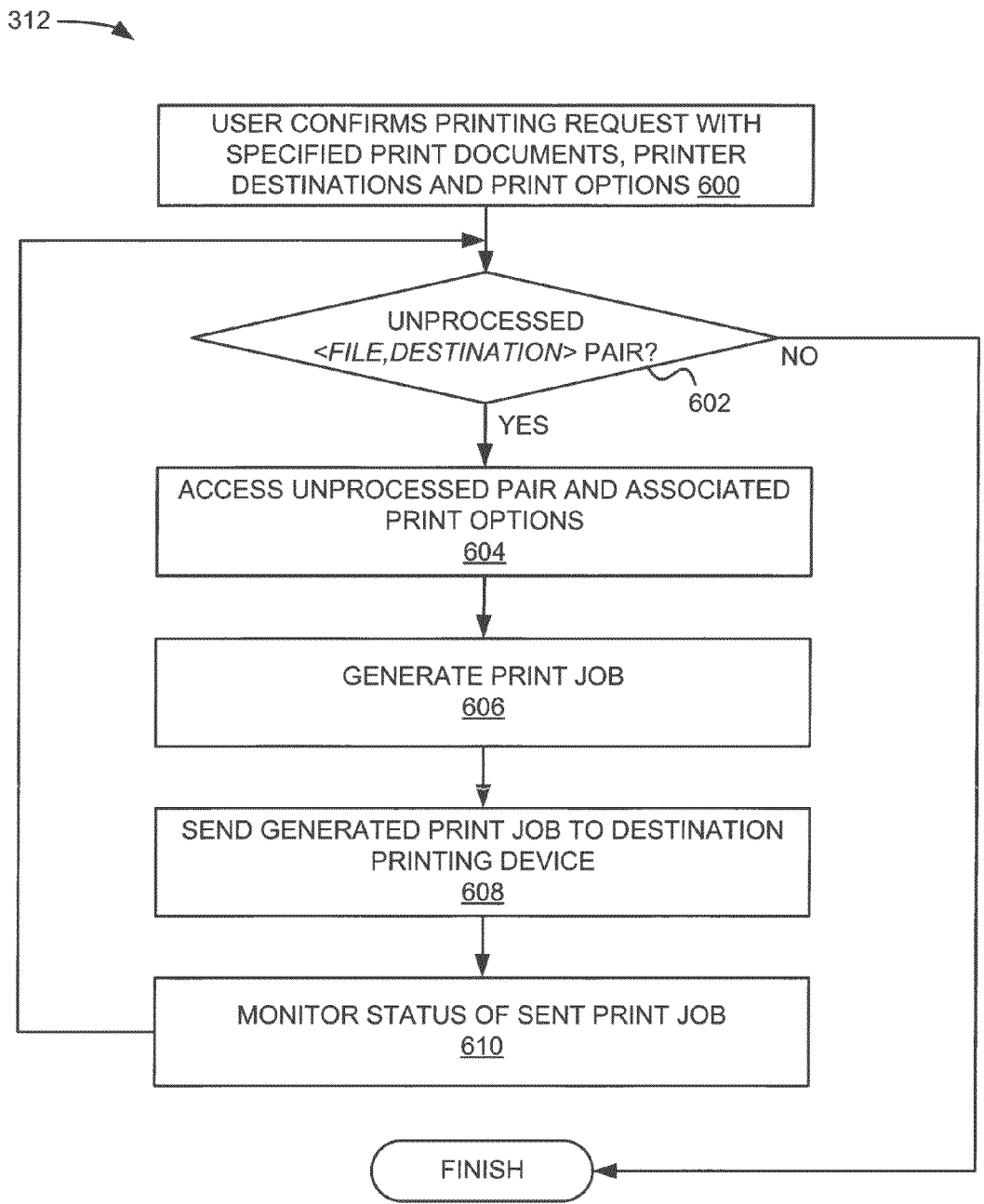
FIG. 6 is a flowchart of a method of submitting print jobs to a cloud print service, according to some embodiments.

FIG. 6 is a flowchart of a method to perform the operation 312 of submitting a batch print job to printing devices 120 via a cloud print service, according to some embodiments. A batch print job comprises instructions to print each of two or more documents to each of two or more printing devices. In some instances, the method of FIG. 6 can be performed to print one document to two or more printing devices or to print two or more documents to one printing device.

In an operation 600, a confirmation of the printing request is received by the network printing server 104 from a user via the user device 102. The confirmation can be received in response to the prompt presented in the operation 562 of FIG. 5B. The receipt of the confirmation was also described in the operation 310 of FIG. 3.

In an operation 602, a determination is made as to whether there is an unprocessed <file,destination> pair within the print request. A <file,destination> pair is unprocessed if it has not yet been sent to the indicated destination printing device for printing. If there are no unprocessed pairs, the operation 312 ends as all print jobs have been sent to the printing devices 120.

If there is a unprocessed pair, the network printing server 104 accesses an unprocessed <file,destination> pair and its associated print options in an operation 604. The print options can be expressed as attribute-value pairs. In some instances, the <file,destination> pair into a n-tuple where each position has a pre-defined correspondence with an attribute and where the n-tuple includes a value of the attribute. The value of the attribute can be a general option or a detailed option.

In an operation 606, the network printing server generates a print job from the n-tuple of the operation 604. The print job comprises a series of instructions executable by the destination printing device 120 for printing the file. For example, the print job can be formatted according a printing device-specific API. In an operation 608, the network printing server 104 sends the generated print job to the destination printing device 120.

In an operation 610, the network printing server 104 monitors the status of the sent print job based on status messages received from the printing device. The operation 602 through 610 can be performed faster than the printing devices 120 actually print the documents. In these instances, the operation 610 can be performed in parallel for a plurality of print jobs. The network printing server 104 may generate a status GUI to inform the user of the user device 102 of the status of the print jobs within the batch print job.

VII. EXAMPLE USER INTERFACES

FIGS. 7A-9 depict example user interfaces used for defining a plurality of print jobs within a batch print job, setting general and detailed print options, and monitoring sent print jobs, according to various embodiments. The user interfaces are provided as examples to illustrate one implementation of the network printing server 104 and its functionality.

A. Selecting Documents

Figure 7A:
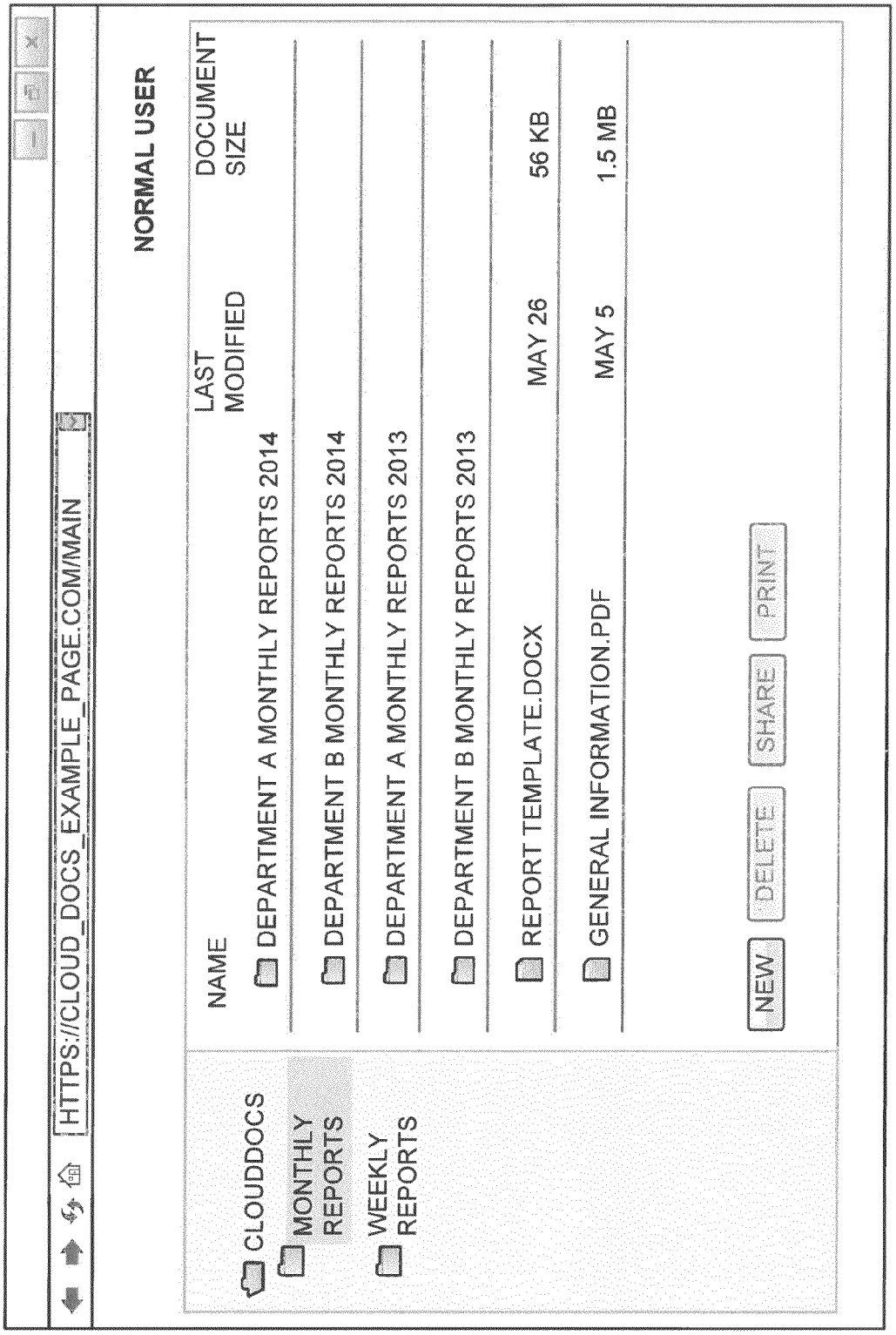

FIG. 7A depicts an example of a user interface that can be used to select documents to be printed. As depicted, the user interface is provided by the network printing server 104 via a web browser at the user device 102. The interface includes a navigable list of files and file folders in a "clouddocs" directory storing, for example, cloud documents 206.

FIG. 7B depicts the user interface of FIG. 7A where the user has performed one or more actions to select documents to print. In the depicted example, as indicated by shading, the user has selected file folders "Department A Monthly Reports 2014" and "Department A Monthly Reports 2013", and file "General Information.pdf" to print. When the user selects a file folder, each file in the file folder is selected to be printing. For example, in the monthly reports folders, twelve files, one for each month of the year, are stored. All twelve of the documents will be printed when the folder is selected by the user. In other instances, the user can elect to open the folder to view the contents and select a portion of the files contained therein. The user, upon selecting the "print" button", is then directed to one or more interfaces for selecting destination printing devices (not shown).

B. Setting Print Options

FIG. 8A depicts an example user interface for setting general print options. The user interface includes a count of documents to be printed and a listing of destination printing devices 120 (e.g., "Printer A, Printer B; Printer C"). From this interface, the user can select an option to initiate printing and to cancel printing. The user is further given an option to change the destination printing devices.

As shown in FIG. 8A, the general print options set include attributes such as the number of copies, that all pages in the documents be printed, that duplexing (i.e., double-sided printing) is turned off, and that the paper orientation is portrait. Of these, the duplexing option is common amongst all of the destination printing devices. No general options are selected for other attributes such as "color printing" or "staple" because the destination printing device do not share a common default value for these attributes. The user interface of FIG. 8A further includes an option to access detailed options.

FIG. 8B depicts an example of a user interface for setting detailed options accessible via the interface of FIG. 8A. The interface includes a table arrangement of the print jobs where each row corresponds to a file and each column corresponds to a destination printing device. Each entry includes an option to change or edit the settings for the print job.

The first row of the table includes options to set options for all documents on a predestination basis. These entries are populated with the general options and the default values of the documents and/or destinations. For example, printers A and B have a default value for printing in color. Printer C has a default value to print in black and white. If, in the first row of the table labeled "All Documents", the user edits the setting for Printer A from "Color" to "Black and White", the setting is changed for all documents printed at Printer A.

C. Tracking Status of Print Jobs

FIG. 9 depicts an example user interface used for monitoring sent print jobs, according to various embodiments. The interface includes a list of the documents sent to the corresponding destination printing device, a date the print job was submitted, and a current status of the print job. The user interface is populated and updated based on status data received from the printing devices 120. In other instances, the print jobs can be grouped or sorted by printing device.

VII. IMPLEMENTATION MECHANISMS

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
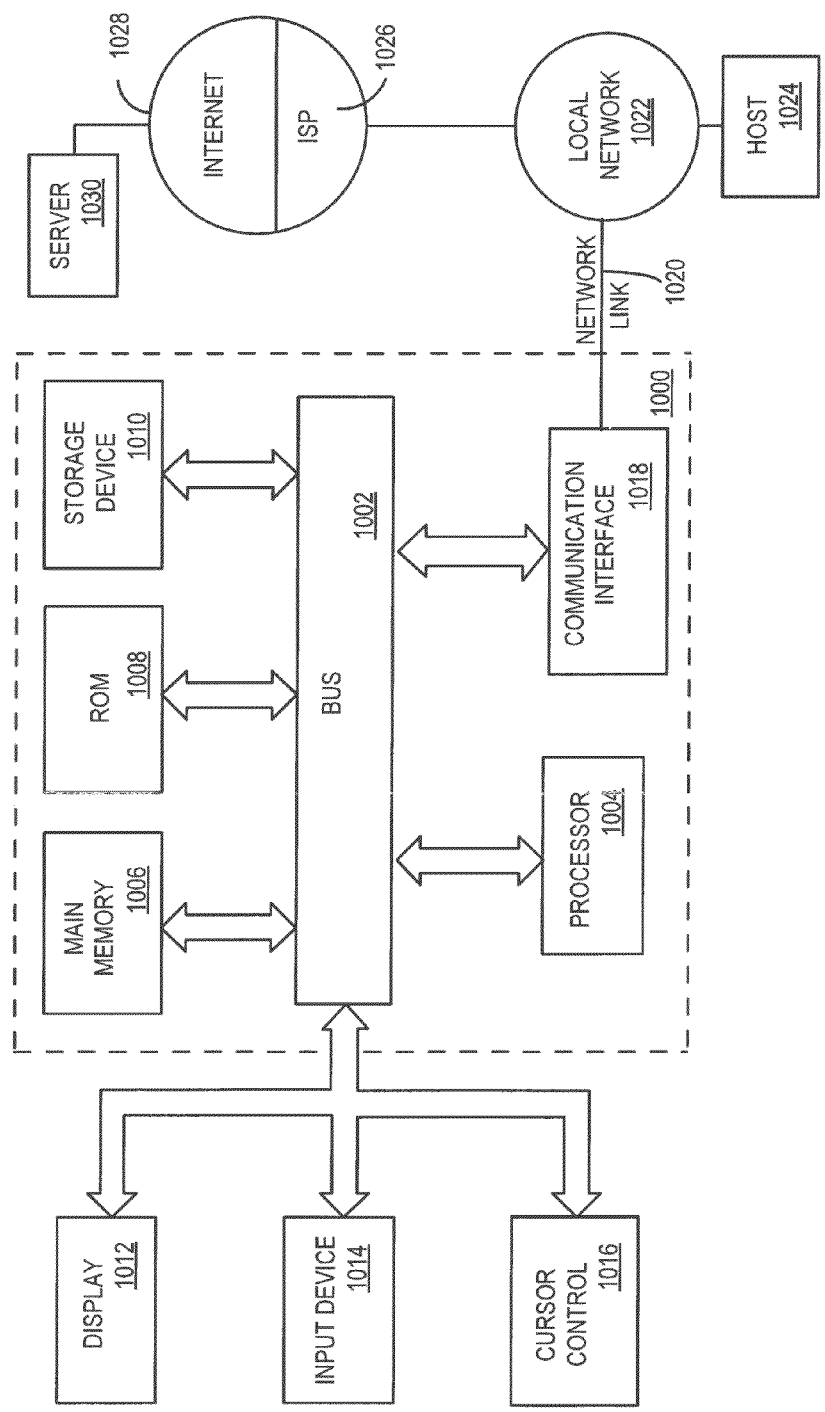
FIG. 10 is a block diagram that depicts an example computer system upon which embodiments may be implemented.

FIG. 10 is a block diagram that depicts an example computer system 1000 upon which embodiments may be implemented. Computer system 1000 includes a bus 1002 or other communication mechanism for communicating information, and a processor 1004 coupled with bus 1002 for processing information. Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. Although bus 1002 is illustrated as a single bus, bus 1002 may comprise one or more buses. For example, bus 1002 may include without limitation a control bus by which processor 1004 controls other devices within computer system 1000, an address bus by which processor 1004 specifies memory locations of instructions for execution, or any other type of bus for transferring data or signals between components of computer system 1000.

An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic or computer software which, in combination with the computer system, causes or programs computer system 1000 to be a special-purpose machine. According to one embodiment, those techniques are performed by computer system 1000 in response to processor 1004 processing instructions stored in main memory 1006. Such instructions may be read into main memory 1006 from another computer-readable medium, such as storage device 1010. Processing of the instructions contained in main memory 1006 by processor 1004 causes performance of the functionality described herein. In alternative embodiments, hard-wired circuitry may be used in place of or in combination with software instructions to implement the embodiments. Thus, embodiments are not limited to any specific combination of hardware circuitry and software.

The term "computer-readable medium" as used herein refers to any medium that participates in providing data that causes a computer to operate in a specific manner. In an embodiment implemented using computer system 1000, various computer-readable media are involved, for example, in providing instructions to processor 1004 for execution. Such a medium may take many forms, including but not limited to, non-volatile media and volatile media. Non-volatile media includes, for example, optical or magnetic disks, such as storage device 1010. Volatile media includes dynamic memory, such as main memory 1006. Common forms of computer-readable media include, without limitation, a floppy disk, a flexible disk, hard disk, magnetic tape, or any other magnetic medium, a CD-ROM, any other optical medium, a RAM, a PROM, and EPROM, a FLASH-EPROM, any other memory chip, memory cartridge or memory stick, or any other medium from which a computer can read.

Various forms of computer-readable media may be involved in storing instructions for processing by processor 1004. For example, the instructions may initially be stored on a storage medium of a remote computer and transmitted to computer system 1000 via one or more communications links. Bus 1002 carries the data to main memory 1006, from which processor 1004 retrieves and processes the instructions. The instructions received by main memory 1006 may optionally be stored on storage device 1010 either before or after processing by processor 1004.

Computer system 1000 also includes a communication interface 1018 coupled to bus 1002. Communication interface 1018 provides a communications coupling to a network link 1020 that is connected to a local network 1022. For example, communication interface 1018 may be a modem to provide a data communication connection to a telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. The received code may be processed by processor 1004 as it is received, and/or stored in storage device 1010, or other non-volatile storage for later execution.

In the foregoing specification, embodiments have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A network printing server comprising:
   one or more processors; and
   one or more non-transitory data storage media in the network printing server storing instructions which when processed cause the network printing server to perform:
   for a user device logically connected to the network printing server, determining a set of one or more printing devices from a plurality of printing devices available to the network printing server;
   receiving, via a public network, an instruction to print a plurality of documents at a particular printing device of the set of one or more printing devices from the plurality of the printing devices;
   generating, for each document of the plurality of documents, an instruction instructing the particular printing device to print the document;
   transmitting, via the public network, the generated instructions for printing each document of the plurality of documents as a series of print jobs to the particular printing device;

receiving print job status data of a first print job of the series of print jobs and a second print job of the series of print jobs from the particular printing device;

generating a presentation of the print job status data; and transmitting the presentation of the print job status data to the user device.

2. The network printing server of claim 1, wherein the one or more non-transitory data storage media in the network printing server storing instructions which when processed cause the network printing server to further perform:

receiving, via a public network, an instruction to print the plurality of documents at two or more particular printing devices of the set of one or more printing devices from the plurality of the printing devices;

generating, for each of the two or more particular printing devices from the set of one or more printing devices of the plurality of the printing devices, second instructions instructing the two or more printing devices to print the plurality of documents; and transmitting, via the public network, the generated second instructions as parallel print jobs to the two or more particular printing devices of the set of one or more printing devices from the plurality of the printing devices.

3. The network printing server of claim 1, wherein the public network is the Internet.

4. The network printing server of claim 1, wherein the set of one or more printing devices are printing devices from the plurality of printing devices that are registered with the user device.

5. The network printing server of claim 1, wherein the instruction to print the plurality of documents comprises a selection of one or more file folders collectively containing the plurality of documents.

6. The network printing server of claim 1, wherein the plurality of documents are at least two of cloud documents, device local documents, and web content.

7. The network printing server of claim 1, wherein the instruction instructing the particular printing device to print a first document of the plurality of documents comprises setting a first plurality of print options for printing the first document, and wherein the instruction instructing the particular printing device to print a second document of the documents comprises setting a second plurality of print options for printing the second document.

8. The network printing server of claim 7, wherein the first plurality of print options is distinct from the second plurality of print options.

9. A non-transitory computer-readable medium having instruction embodied thereon, wherein the instructions when processed cause a network printing server to perform:

for a user device logically connected to the network printing server, determining a set of one or more printing devices from a plurality of printing devices available to the network printing server;

receiving, via a public network, an instruction to print a plurality of documents at a particular printing device of the set of one or more printing devices from the plurality of the printing devices;

generating, for each document of the plurality of documents, an instruction instructing the particular printing device to print the document;

transmitting, via the public network, the generated instructions as a series of print jobs to the particular printing device;

receiving print job status data of a first print job of the series of print jobs and a second print job of the series of print jobs from the particular printing device;

generating a presentation of the print job status data; and transmitting the presentation of the print job status data to the user device.

10. The computer-readable medium of claim 9, wherein the public network is the Internet.

11. The computer-readable medium of claim 9, wherein the set of one or more printing devices are printing devices from the plurality of printing devices that are registered with the user device.

12. The computer-readable medium of claim 9, wherein the instruction to print the plurality of documents comprises a selection of a file folder containing the plurality of documents.

13. The computer-readable medium of claim 9, wherein the plurality of documents are at least two of cloud documents, device local documents, and web content.

14. The computer-readable medium of claim 9, wherein the instruction instructing the particular printing device to print a first document of the plurality of documents comprises setting a first plurality of print options for printing the first document, and wherein the instruction instructing the particular printing device to print a second document of the documents comprises setting a second plurality of print options for printing the second document.

15. The computer-readable medium of claim 9, wherein the first plurality of print options for printing the first document is distinct from the second plurality of print options for printing the second document.

16. A method comprising:

for a user device logically connected to a network printing server, determining, by the network printing server, a set of one or more printing devices from a plurality of printing devices available to the network printing server;

receiving, by the network printing server, via a public network, an instruction to print a plurality of documents at a particular printing device of the set of one or more printing devices from the plurality of the printing devices;

generating, by the network printing server, for each document of the plurality of documents, an instruction instructing the particular printing device to print the document;

transmitting, by the network printing server, via the public network, the generated instructions for printing each document of the plurality of documents as a series of print jobs to the particular printing device;

receiving, by the network printing server, print job status data of a first print job of the series of print jobs and a second print job of the series of print jobs from the particular printing device;

generating, by the network printing server, a presentation of the print job status data; and transmitting, by the network printing server, the presentation of the print job status data to the user device.

17. The method of claim 16, wherein the plurality of documents are at least two of cloud documents, device local documents, and web content.

18. The method of claim 16, wherein instructing the particular printing device to print a first document of the plurality of documents comprises setting a first plurality of print options for printing the first document, and wherein instructing the particular printing device to print a second document of the documents comprises setting a second plurality of print options for printing the second document.

\* \* \* \* \*